May 9, 1961
R. M. HELLER ET AL
2,983,534
COMPOSITE ARTICLE
Filed Sept. 22, 1958
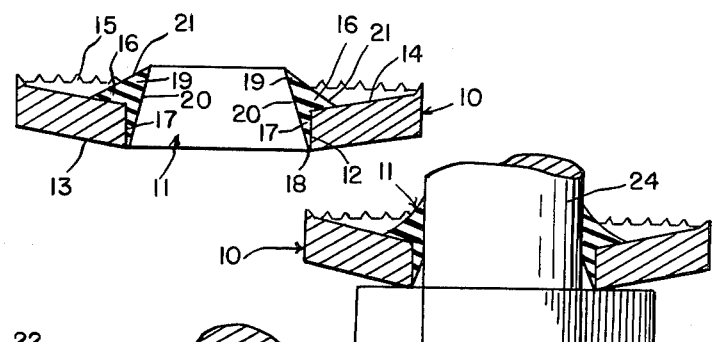
FIG.1.
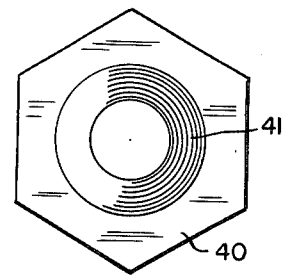
FIG.4.
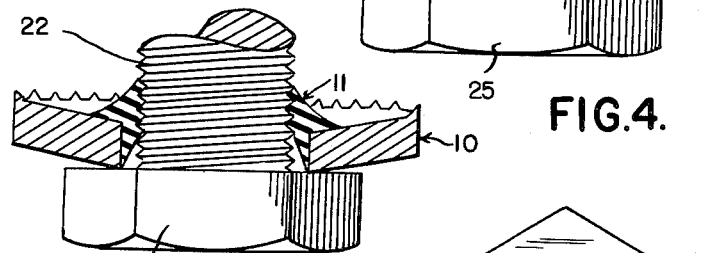
FIG.3.
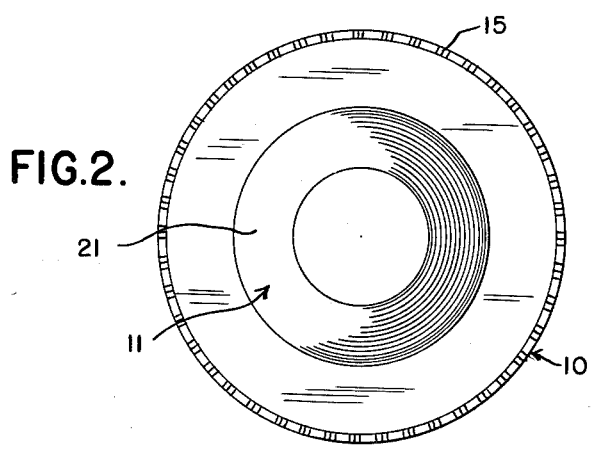
FIG.2.
FIG.6.
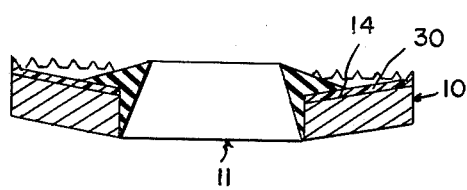
FIG.5.
INVENTORS
ROBERT M. HELLER
RAYMOND A. CRAGIN
EDWARD L. MROZ
BY
ATTORNEYS United States Patent Office 2,983,534
Patented May 9, 1961

2,983,534
COMPOSITE ARTICLE
Robert M. Heller, 377 Berwyn, Birmingham, Mich.; Raymond A. Cragin, 235 Guilford, Bloomfield Hills, Mich.; and Edward L. Mroz, 16517 Prest, Detroit, Mich.

Filed Sept. 22, 1958, Ser. No. 762,478

6 Claims. (Cl. 288—20)

This invention relates generally to composite articles, and refers more particularly to composite washers, composite nuts, and the like.

One of the essential objects of the invention is to provide a composite article of the type mentioned, wherein a washer, nut or the like, has bonded thereto a ring or annulus of resilient and deformable material that is operable to securely hold or retain such washer or nut against displacement when sleeved upon the shank or stem of a bolt, screw or the like, and that is also operable as a sealant to effectively prevent dirt, dust and moisture from passing between the washer or nut and the shank or stem of the bolt or screw when the parts are assembled.

Another object is to provide a composite article, wherein the resilient ring is formed from an exactly metered quantity of liquid plastisol, such as polyvinyl chloride, or the like, that is deposited upon and is bonded permanently to the washer to become an integral part thereof.

Another object is to provide a composite article, wherein the resilient ring has two integrally connected diverging portions respectively within the bore and upon one face of the washer, so that the portion within said bore will bind against and have sealing engagement with the shank of a bolt when the composite article is applied thereto, and the portion upon one face of the washer will have sealing engagement with the adjacent face of any separate article to which the assembled bolt and composite article are fastened.

Another object is to provide a composite article, wherein the portion of the resilient ring within the bore of the washer has one end substantially flush with the uncovered face of the washer, and has at its other end an axial extension that projects outwardly beyond the other face of the washer and that is joined to and braced by the portion of the resilient ring upon said other face of the washer.

Another object is to provide a composite article, wherein the ring is substantially V-shape in cross section and straddles a corner of the washer, and wherein the two diverging leg portions aforesaid of the V are tapered from the joint therebetween.

Another object is to provide a composite article, wherein the outer sides of the ring of V-cross section are inclined from the apex of the V to the pointed ends respectively of the two tapered portions, whereby one of said sides forms a substantially frusto-conical opening for the reception of the shank or stem of the bolt or screw, and the other side forms a relatively smooth surface disposed at substantially an obtuse angle to the adjacent surface of the washer for sealing engagement with the adjacent surface of the separate article to which the assembled bolt and composite article are fastened.

Another object is to provide a composite article, wherein the diameter at the small end of the frusto-conical opening is less than the cross sectional area or diameter of the shank or stem of the bolt or screw, whereby the axial extension aforesaid will have a tight fit upon and sealing engagement with the shank or stem of the bolt or screw when the composite article is assembled therewith.

Another object is to provide a composite article, wherein the intensity of the tight fit and sealing engagement just mentioned will be forcibly increased and braced by the portion of the ring on the surface of the washer when said portion is compressed by the adjacent surface of the separate article during tightening movement of the bolt relative to said separate article.

Another object is to provide a composite article that is simple in construction, economical to manufacture, and efficient in use.

Other objects, advantages and novel details of construction of this invention will be made more apparent as this description proceeds, especially when considered in connection with the accompanying drawing, wherein:

Fig. 1 is a vertical sectional view through a composite article embodying our invention;

Fig. 2 is a top plan view of the composite article;

Fig. 3 is a vertical sectional view through the composite article after it has been applied to the threaded shank of a bolt;

Fig. 4 is a vertical sectional view through the composite article after it has been applied to the smooth shank of a bolt;

Fig. 5 is a vertical sectional view through a slightly modified composite article;

Fig. 6 is a top plan view of another form of composite article wherein a nut is employed instead of a washer.

In the accompanying drawing, 10 is a washer, and 11 is a ring or annulus of a composite article embodying our invention.

As shown, the washer 10 is formed of metal and has a central opening or bore 12. Preferably, such washer 10 has a smooth convex surface 13 and a smooth concave surface 14, and is provided at the periphery of the concave surface 14 with a series of circumferentially spaced teeth 15.

The ring or annulus 11 is formed from a resilient and deformable material, and preferably is formed from an exactly metered quantity of liquid plastisol, such as polyvinyl chloride or the like, that is deposited by means (not shown) upon the washer 10 when the latter is sleeved upon a suitable mandrel (not shown). When cured, such ring or annulus 11 is bonded permanently to and becomes an integral part of the washer 10.

Preferably, the ring or annulus 11 has two integrally connected diverging portions 16 and 17 respectively within the central opening or bore 12 and upon the concave surface 14 of the washer. The portion 17 within the opening or bore 12 has one end 18 substantially flush with the uncovered convex surface 13 of the washer, and has at its other end an axial extension 19 that projects outwardly beyond the concave surface 14 of the washer and that is joined to and braced by the other portion 16 upon said concave surface 14.

Actually, the ring or annulus 11 is substantially V-shaped in cross section and straddles a corner of the washer. Also, each of the diverging portions 16 and 17 is tapered from the joint therebetween, and the outer sides 20 and 21 respectively of the ring or annulus are inclined from the apex of the V to the pointed ends respectively of the two tapered portions 16 and 17. Thus, one outer side 20 forms a substantially frusto-conical opening, while the other outer side 21 forms a relatively smooth surface disposed at substantially an obtuse angle to the concave surface 14 of the washer.

In the present instance, the composite article is adapted to be sleeved upon either a threaded shank or stem 22 of a bolt or screw 23, as illustrated in Fig. 3, or upon a smooth shank or stem 24 of a bolt or screw 25, as illustrated in Fig. 4. In either illustration, the ring or annulus 11 is operable to securely hold or retain such composite article against displacement, and also is operable as a sealant to effectively prevent dirt, dust and moisture from passing between the washer 10 and the shank or stem of the bolt or screw when the parts are assembled.

The diameter at the small end of the frusto-conical opening formed by the outer side 20 is less than the cross sectional area or diameter of the shank or stem of the bolt or screw, so that the axial extension 19 will have a tight fit upon and sealing engagement with the shank or stem of the bolt or screw when the composite article is assembled therewith.

When the assembled bolt and composite article are attached or fastened to a separate article (not shown) the portion 16 of the ring or annulus upon the concave surface 14 of the washer will be compressed by the adjacent surface of said separate article during tightening movement of the bolt, and such compression will cause the axial extension 19 and tapered portion 17 to be deformed and pressed harder or tighter against the shank or stem of the bolt. Consequently, a tight seal will be obtained between the ring or annulus 11 and the separate article to which the bolt or screw is attached, and the tight fit and sealing engagement between the ring 11 and the shank of the bolt will be increased or intensified during tightening movement of the bolt. It will also be apparent that the circumferentially spaced teeth 15 on the washer will bite into the adjacent surface of the separate article during the tightening movement of the bolt to obtain a firm anchorage between the washer and said adjacent surface.

In Fig. 5, we have illustrated a slight modification, wherein the concave surface 14 of the washer 10 is initially provided with an adhering coating 30 of plastic material to which the subsequently applied material of the ring or annulus 11 will adhere. Otherwise, the construction in Fig. 5 is the same as in Figs. 1 and 2.

In Fig. 6, we have illustrated another form of composite article, wherein an ordinary nut 40 is employed instead of the washer 10 and is provided with a ring or annulus 41 of resilient and deformable material similar in every respect to the ring or annulus 11 in Figs. 1 and 2. However, in this construction, the circumferentially spaced teeth 15 have been eliminated entirely.

Thus, from the foregoing it will be apparent that we have provided a composite article that not only is capable of being securely anchored to and having sealing engagement with the shank or stem of a bolt or screw, but also is capable of having sealing engagement with a separate article to which the assembled bolt and composite article are attached or fastened.

What we claim as our invention is:

1. A composite article comprising a rigid body having a substantially cylindrical opening therethrough, and a one-piece sealing ring of deformable material permanently united to said body, said ring having an annular portion of substantially V shape in cross section within and coextensive with the cylindrical opening aforesaid and having beyond one surface of said body in end-to-end relation with said annular portion an integral annular axial extension of substantially inverted V shape in cross section, said annular portion and said annular extension having axially aligned connecting inner conical surfaces collectively forming a continuous conical surface in registration with the opening in said body for gripping sealing engagement with the shank of a fastening member, said ring also having at approximately the juncture of said annular portion and said annular extension a laterally projecting annular portion of substantially inverted V shape in cross section, said annular extension and said laterally projecting annular portion having aligned connecting outer conical surfaces collectively forming a continuous conical surface merging with the continuous conical surface aforesaid, said annular portion and said laterally projecting annular portion having connecting outer annular surfaces disposed at substantially right angles to each other and respectively united permanently in substantially parallel relation to the walls of the opening in said body and to one adjacent surface of said body, the first mentioned continuous conical surface being deformable when it is subjected to gripping sealing engagement with the shank of a fastening member, and said laterally projecting annular portion being operable as a brace for said annular extension when the first mentioned continuous conical surface is in deformed gripping engagement with the shank of a fastening member.

2. The structure defined in claim 1, wherein an adhesive coating is provided between and in surface-to-surface relation to the annular surface of said laterally projecting annular portion and the adjacent surface of said body.

3. The structure defined in claim 1, wherein the body is formed of metal, and the one-piece sealing ring is formed of resilient material.

4. The structure defined in claim 2, wherein the body is formed of metal, the one-piece sealing ring is formed from a liquid plastisol, and the adhesive coating is formed of plastic material.

5. The structure defined in claim 1, wherein the body is a metal plate-like member.

6. The structure defined in claim 1, wherein the body is a metal nut.

References Cited in the file of this patent

UNITED STATES PATENTS

| | | |
|---|---|---|
| 2,309,446 | Ekkebus | Jan. 26, 1943 |
| 2,643,904 | Wehmanen | June 30, 1953 |
| 2,706,656 | Roubal | Apr. 19, 1955 |
| 2,761,347 | McKee | Sept. 4, 1956 |

FOREIGN PATENTS

| | | |
|---|---|---|
| 138,181 | Sweden | Nov. 25, 1952 |